United States Patent [19]

Nishino et al.

[11] Patent Number: 4,714,569

[45] Date of Patent: Dec. 22, 1987

[54] PROCESS FOR PREPARING CONDUCTIVE COATING COMPOSITION

[75] Inventors: Hiroshi Nishino, Yokohama; Kazuo Okabe, Warabi, both of Japan

[73] Assignee: Toska Co., Ltd., Tokyo, Japan

[21] Appl. No.: 888,196

[22] Filed: Jul. 22, 1986

[51] Int. Cl.$^4$ .............................................. H01B 1/06
[52] U.S. Cl. ..................................... 252/511; 252/510
[58] Field of Search ................ 252/510, 511; 524/495, 524/496

[56] References Cited

U.S. PATENT DOCUMENTS

| | | | |
|---|---|---|---|
| 4,412,938 | 11/1983 | Kakizaki et al. | 252/511 |
| 4,465,615 | 8/1984 | Hata | 252/511 |
| 4,588,087 | 12/1985 | Yamakawa et al. | 252/511 |
| 4,592,862 | 6/1986 | Nakamura et al. | 252/511 |

*Primary Examiner*—Josephine L. Barr
*Attorney, Agent, or Firm*—Armstrong, Nikaido, Marmelstein & Kubovcik

[57] ABSTRACT

A process for preparing a conductive coating composition comprising the steps of forming a graft copolymer onto the surfaces of graphite and carbon black, adding an azo compound to the reaction system to complete the reaction, and curing the resulting product to form a network structure inside the product.

6 Claims, No Drawings

PROCESS FOR PREPARING CONDUCTIVE COATING COMPOSITION

BACKGROUND

The present invention relates to a process for preparing a conductive coating composition excellent in physical properties such as printability, adhesion to a substrate, conductivity in the form of a coating film, environmental resistance, etc.

There has heretofore been known a process for obtaining a resistance element by mechanically dispersing carbon black or a fine graphite powder in a resin or the like. However, the resulting element involves defects such as a relatively high electric resistance, non-uniform resistance values differing from portion to portion, and a very large variation of a resistance value with a temperature increase due to a low bonding strength of the carbon black or graphite component to the resin, so that it is particularly unfit for use at relatively high temperatures.

An attempt has been made to prepare a resistance element by graft-copolymerizing an adequate polymer onto the surfaces of particles of furnace black or acetylene black having a high structure to provide a network structure (see Japanese patent publication No. 44-3826). It involves, however, a problem of loss of flexibility when the resistance is reduced to several $\Omega.cm$.

SUMMARY

An object of the present invention is to provide a process for preparing a conductive coating composition capable of forming a coating film having a very low electric resistance of about 0.05 $\Omega.cm$ or less and excellent in physical properties such as flexibility, adhesion, etc.

In this aspect, the gist of the present invention resides in a process for preparing a conductive coating composition, comprising the steps of reacting a mixture of graphite and carbon black with a vinyl monomer having a functional group together with other monomer(s) used as a comonomer in the presence of a peroxide catalyst to form a graft copolymer onto the surfaces of the above-mentioned graphite and carbon black, adding an azo compound to the reaction system to complete the reaction, and adding a substance having a group capable of easily reacting with the above-mentioned functional group to the resulting product to form a network structure inside the product.

The foregoing and other objects, and features of the present invention will be apparent from the following description.

THE PREFERRED EMBODIMENT (1) First step reaction:

In the present invention, a vinyl monomer having a functional group is reacted with a mixture of graphite and carbon black together with comonomers in the presence of a peroxide catalyst in the first step to form a graft copolymer onto the surfaces of the above-mentioned graphite and carbon black.

The graphite or carbon black is not specifically limited, and may be any one generally known. Oxygen-containing groups including aroxylic type structures having an unpaired electron, quinone type oxygen atoms, and hydroxyl groups are present in addition to benzenoidal rings on the surfaces of particles of commercially available carbon black such as furnace black or acetylene black. It is known that all these groups can serve as reaction sites against free radicals or polymer radicals. The number of reaction sites is believed to be or $10^{20}/g$ or more. On the other hand, a graphite powder surface has a large number of oxygen-containing groups formed during the course of mechanical pulverization. These oxygen-containing groups can capture growing polymer radicals formed during the polymerization of vinyl monomers. This phenomenon was experimentally found by the inventors of the present invention. When polymerization of vinyl monomers is effected by using, for example, only a graphite powder of 6 $\mu m$ in average particle size in the presence of cumene hydroperoxide as an initiator, the graphite powder comes to be dispersed as a stable colloid in the reaction medium.

The vinyl monomer to be used as a comonomer in the present invention is a vinyl compound or an analogous compound, examples of which include acrylic esters such as methyl acrylate and ethyl acrylate, methacrylic esters such as methyl methacrylate and ethyl methacrylate, acrylonitrile, vinyl acetate, styrene, and N-vinyl-2-pyrrolidone. They may be used alone or in combination of two or more of them. The vinyl monomer having a functional group is one having a functional group such as a carboxyl, amino, hydroxyl, or acid anhydride group in the structural composition, examples of which include acrylic acid, methacrylic acid, glycidyl methacrylate, 2-hydroxyethyl acrylate, 2-hydroxyethyl methacrylate, 2-hydroxypropyl methacrylate, methacrylamide, and maleic anhydride. They may be used in combination of two or more of them unless they interact with each other to form a gel. For example, 2-hydroxyethyl methacrylate and 2-hydroxypropyl methacrylate can be combined for use. In order to impart flexibility to the finally obtained conductive coating, it is particularly preferable to form a graft polymer of a multi-component copolymer type by using a plurality of monomers.

Cumene hydroperoxide, di-t-butyl peroxide, p-cymene hydroperoxide, etc. having a property of forming a polymer with a relatively small molecular weight can be used as the peroxide catalyst (initiator). The peroxide catalyst is also advantageous in that it attacks benzenoidal rings present on the surface of graphite or carbon black to give rise to unpaired electrons thereon, thus affording another site for the graft reaction of copolymer radicals formed in the reaction system. Therefore, the presence of the peroxide catalyst enables a copolymer radical having a very low degree of polymerization to be grafted onto the surfaces of graphite and carbon black during the course of the first step reaction. This provides an advantage that the final thermal curing reaction (formation of a network structure) can be allowed to proceed efficiently. In the first step reaction, a graft copolymer can also be prepared by using an azo compound such as 2,2'-azobisisobutyronitrile as the initiator instead of the peroxide. However, such an azo compound forms 2-cyano-2-propyl radicals, etc. upon thermal decomposition, and the formed radicals react with oxygen-containing groups present on the surfaces of the graphite powder or carbon black as well to provide liability to deprive them of the reaction sites for polymer radicals, leading to reduction in grafting efficiency. Thus, colloidal particles of the graft copolymer lose stability. In contrast, free radicals formed by decomposition of cumene hydroperoxide or the like can initiate polymerization of monomers, but do not react with the oxygen-containing groups present on the surfaces of the graphite powder and the carbon black. This leads to advantages including an increase in the grafting efficiency and a stability attained in the colloidal solution since no competition with the graft reaction is involved. Although a graft copolymer is formed by using also a diaroyl peroxide such as benzoyl peroxide as the initiator, a crystalline substance such as benzoic acid is also formed in the presence of carbon black, leading to the danger of damaging the electrical properties in use of the resulting graft copolymer in the form of a coating film. In this sense, the peroxide used in the first step reaction is preferably one capable of serving as the initiator for the polymerization of compounds such as vinyl monomers having no hazardousness of explosion or the like in the use thereof, and forming a decomposition product which does not adversely affect the final product, if any. Among others, cumene hydroperoxide or the like is known to form a polymer having a relatively low degree of polymerization in the polymerization of methyl methacrylate, and to form decomposition products, almost all of which are contained as the initiator fragments or terminal groups in the polymer. Thus, they can be deemed to be good initiators.

In the reaction of a mixture of graphite and carbon black with a vinyl monomer having a functional group together with comonomer(s) in the presence of a peroxide catalyst according to the present invention, the proportion of materials used is not particularly limited. In an instance of using a mixture of graphite and high-structure carbon black having an oil absorption value of about 200 ml/100 g, the mixing ratio (by weight) of the graphite to the carbon black is 2.5 to 0.8 : 1, preferably 1.5 to 1.0 : 1, while 70 to 100 parts by weight of vinyl monomers and 0.3 to 0.5 parts by weight of a peroxide catalyst are used per 100 parts by weight of the mixture of graphite and carbon black. Outside the above-specified range, for example too much of vinyl monomers result in large electric resistance of a coating film formed from the final product, while too little vinyl monomers result in deterioration of physical properties of a coating film. When the amount of the peroxide catalyst exceeds the above-specified range, a homopolymer having a low degree of polymerization is formed, arousing the danger of damaging the strength of a coating film.

The first step reaction may be effected according to a customary method. For example, a mixture of graphite and carbon black, a vinyl monomer having a functional group, other monomer(s) as a comonomer, and a peroxide catalyst are put in a solvent, and stirred at a temperature of 80° to 95° C. for 0.5 to 1.5 hours. A solvent is chosen from among those capable of serving as a solvent for the product formed in the reaction system, and may be used alone or in admixture. Examples of the solvent include toluene, xylene, tetrahydrofuran, 1,4-dioxane, dimethylformamide, ethylene glycol diethyl ether, ethylene glycol monoethyl ether acetate, isophorone, diethylene glycol monoethyl ether acetate, ethylene glycol dibutyl ether and cyclohexanone. Among them, those having a boiling point of 100° C. or higher and containing neither hydroxyl nor amino group are preferred.

A graft copolymer can be formed on the respective surfaces of graphite or carbon black by the first step reaction.

(2) Second step reaction:

Subsequently, an azo compound is added to the reaction system to complete the polymerization of the vinyl monomers.

2,2'-azobisisobutyronitrile, 2,2'-azobis-2,4-dimethylvaleronitrile, etc. having a capacity of initiating polymerization can be used as the azo compound. The amount of the azo compound added is about 0.6 to 1.2 parts by weight per 100 parts by weight of the mixture of graphite and carbon black.

The addition of the azo compound serves to complete the polymerization of the vinyl monomers remaining in the reaction system.

Subsequently, in the present invention, a curing agent consisting of a substance capable of easily reacting with a functional group contained in the above-mentioned copolymer, such as a carboxyl, amino, hydroxyl, or acid anhydride group, examples of which substance include epoxy resins and diisocyanates, is admixed with the product formed through the first and second steps, followed by heating, to form a network structure inside the above-mentioned product, whereby the graft copolymers and the homocopolymers are bonded to each other. In this case, the amount of the curing agent to be added may be determined based on the amount of the vinyl monomer having a functional group, which is initially added as a comonomer. When a masked isocyanate (Coronate 2513 manufactured by Nippon Polyurethane Kogyo K.K., Japan) is chosen as the curing agent, the treatment is sufficiently effected at 100° to 150° C. for 0.5 to 1.5 hours. Coronate 2513 herein mentioned is a prepolymer of HDI (hexamethylene diisocyanate) having two isocyanate groups masked with a blocking agent, which can serve as the curing agent when heated at 100° C. or higher to allow deblocking.

The conductive coating composition obtained in the foregoing manner may be admixed with a copolymer prepared in the same manner except for incorporation of neither graphite nor carbon black, followed by passing the mixture through rolls. This enables various coatings having different electric resistances to be prepared.

The present invention will now be further specifically illustrated with reference to Examples and Comparative Examples.

EXAMPLE 1

(a) First step reaction (graft copolymerization)

Raw materials as listed in the following formulation were used.

| graphite and carbon black | |
|---|---|
| Graphite SP - 20 (manufactured by Nippon Kokuen K.K., carbon: >99%, average particle size: 6μ) | 36 g |
| Vulcan XC - 72 R (Cabot Co., mineral oil absorption: 185 ml/100 g) | 24 g |
| solvent mixture | |
| xylene | 30 g |
| ethylene glycol monoethylether acetate | 75 g |
| diethylene glycol monoethylether acetate | 20 g |
| monomers | |
| methyl acrylate | 45 g |
| 2-hydroxyethyl acrylate | 5 g |
| initiator | |
| cumene hydroperoxide | 0.3 g |

The raw materials as listed above were placed in a reactor equipped with a stirrer, a reflux condenser, etc. The mixture was subjected to a reaction at a reaction temperature of 80° to 90° C. for 90 to 120 minutes while stirring the same well. As a result, a peculiar thixotropic phenomenon as observed in the presence of carbon black disappeared and the reaction system came to assume a Newtonian flow. The graphite powder and carbon black were colloidally dispersed in the solution.

Cumene hydroperoxide may be divided in several portions, which are separately added in order to suppress the heat of reaction. The polymerization may be effected while introducing nitrogen into the reactor in order to shorten the reaction time. The characteristic feature of a polymerization reaction in the presence of carbon black or the like consists in that the rate of conversion is adversely decreased with an increase in the stirring rate. Whether the rate of conversion is high or low affects the viscosity of the reaction mixture. In view of the above, it is preferred to adequately control the stirring rate in association with the desired viscosity.

Since one of the purposes of this step was an increase in adhesion to a polyester film as the substrate, it was contrived to obtain a copolymer composition having a solubility parameter close to that of the film.

(b) Second step reaction:

Subsequently, 0.7 g of 2,2'-azobisisobutylonitrile was added to the reaction system in order to polymerize all the residual monomers. The temperature was kept at 80° to 90° C. for 8 hours to effect the reaction. In the course of the reaction, the reaction product became viscous to have a viscosity of 1 to 50 P.

Finally, 17.8 g of a masked isocyanate (Coronate 2513) was added as the curing agent to the whole reaction mixture, followed by kneading with a triple roll mill. Thus, a paste having a viscosity of 150 to 950 P was obtained.

This paste can stand storage for a longer period and is better in coating film properties, as compared with a paste prepared by mixing a copolymer having the same composition with a graphite powder and carbon black by a mechanical means. The particular feature of it consists in that a coating film having a uniform electric resistance not differing from portion to portion can be obtained.

(c) Coating film formation:

In forming a coating film from the above-mentioned paste, printing of a polyester film having a thickness of 125μ was performed with the paste by the screen printing process, followed by heat-curing at 150° C. for 30 minutes, thereby forming a network structure inside.

After curing, a cellophane tape peeling test in which a cellophane tape was sufficiently contact-bonded to the coating film and quickly peeled off was carried out to obtain very good results. A cross-cut test was also carried out. Specifically, 100 square cuttings were formed by cutting the coating film with a cutter knife using a cutter guide, and a cellophane tape was sufficiently contact-bonded to them, followed by quick peeling. When the proportion of squares remaining on the substrate was expressed by a fraction, the adhesion index was 100/100.

After the coating film was immersed in boiling water for 1 hour and dried, the cellophane tape test and the cross-cut test were carried out to respectively obtain good results, which were the same as in the tests carried out before immersion in boiling water.

The electric resistance of the film was measured to find a value of $3.3 \times 10^{-2}$ Ω.cm. When the coating film was folded at 180° to form a crease and folded in the inverse direction at 360°, the rate of an increase in the electric resistance was 18% in the first folding operation and 24% in the inverse folding operation.

Where printing is performed using as the substrate a glass fiber-reinforced epoxy resin, a paper-reinforced phenolic resin, a ceramic plate, a polyimide film, or the like, the monomers and the composition of the graft copolymer can be chosen together with the curing agent among various epoxy resins in accordance with the properties of the substrate.

EXAMPLE 2

Substantially the same procedures as in Example 1 were repeated, except that 45 g of ethyl acrylate was used as the monomer for graft copolymerization instead of the methyl acrylate.

The resulting coating film showed a performance similar to that in Example 1. The electric resistance was $2.6 \times 10^{-1}$ Ω.cm. In the folding test, the rate of an increase in the electric resistance was 23% in the first folding operation and showed the same value of 23% in the inverse folding operation.

EXAMPLE 3

Substantially the same procedures as in Example 1 were repeated except that 36 g of Graphite CSP - E (manufactured by Nippon Kokuen K.K., carbon: >99%, average particle size: 0.8μ) was used as the graphite powder instead of the Graphite SP - 20.

The resulting coating film had a slightly high electric resistance of $10^{-1}$ Ω.cm, as compared with the coating film obtained in Example 1, but had an excellent adhesion to a polyester film. The larger electric resistance than that in Example 1 is believed to be due to the smaller average particle size of the graphite powder.

COMPARATIVE EXAMPLE 1

Substantially the same procedures as in Example 1 were repeated, except that 60 g of Graphite SP - 20 was used without a combined use of carbon black therewith.

The resulting coating film had a slightly high electric resistance of $3.2 \times 10^{-1}$ Ω.cm, and a slightly higher rate of increase in the resistance than that of the coating film obtained in Example 1 in the folding test. This is supportive of a necessity of combined use of carbon black with a graphite powder.

COMPARATIVE EXAMPLE 2

Substantially the same procedures as in Example 1 were repeated, except that 60 g of Vulcan XC - 72 R was used without combined use of a graphite powder therewith.

The resulting coating film was poor in adhesion to a polyester film. The electric resistance was $5.6 \times 10^{-1}$ Ω.cm, and the rate of increase in the resistance was 13% when the folding test was repeated twice.

As described above, according to the present invention, a conductive coating composition having excellent physical properties such as electrical properties and adhesion and having a network structure inside can be obtained. Therefore, the composition of the present invention can contributively serve in the form of a coating film for various industrial products.

We claim:

1. A process for preparing a conductive coating composition, comprising the steps of:
  (a) reacting (i) a mixture of graphite and carbon black, the ratio of graphite to carbon black being 2.5 to 0.8:1 by weight, with (ii) a mixture of a vinyl monomer having a functional group, the functional group being a member selected from the group consisting of a carboxy, an amino, a hydroxy and an acid anhydride group, and a comonomer, the ratio of the vinyl monomer - comonomer mixture to the graphite - carbon black mixture being 0.7 to 1:1, in the presence of a peroxide catalyst, to form a graft copolymer on the sufaces of said graphite and said carbon black;

(b) adding to the reaction mixture an azo compound having the capacity to substantially complete polymerization; and (c) adding to the product formed in (b) a curing agent which reacts with the functional group of said vinyl monomer to produce a network structure inside the product.

2. A process for preparing a conductive coating composition as claimed in claim 1, wherein said vinyl monomer having a functional group is acrylic acid, methacrylic acid, glycidyl methacrylate, 2-hydroxyethyl acrylate, 2-hydroxyethyl methacrylate, 2-hydroxypropyl methacrylate, methacrylamide, or maleic anhydride.

3. A process for preparing a conductive coating composition as claimed in claim 1, wherein said comonomer is an acrylic ester, a methacrylic ester, acrylonitrile, vinyl acetate, styrene, or N-vinyl-2-pyrrolidone.

4. A process for preparing a conductive coating composition as claimed in claim 1, wherein said peroxide catalyst is cumene hydroperoxide, di-t-butyl peroxide or p-cymene hydroperoxide.

5. A process for preparing a conductive coating composition as claimed in claim 1, wherein said azo compound is 2,2'-azobisisobutyronitrile or 2,2'-azobis-2,4-dimethylvaleronitrile.

6. A process for preparing a conductive coating composition as claimed in claim 1, wherein said substance having a group capable of easily reacting with said functional group is one having an epoxy or isocyanate group.

* * * * *